United States Patent
Miki et al.

(10) Patent No.: US 11,530,363 B2
(45) Date of Patent: Dec. 20, 2022

(54) LUBRICANT SOLUTION, METHOD FOR PRODUCING SUBSTRATE PROVIDED WITH LUBRICANT COATING FILM

(71) Applicant: AGC Inc., Tokyo (JP)

(72) Inventors: Toshio Miki, Tokyo (JP); Hiroaki Mitsuoka, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 17/389,906

(22) Filed: Jul. 30, 2021

(65) Prior Publication Data

US 2021/0355405 A1  Nov. 18, 2021

Related U.S. Application Data

(63) Continuation of application No. PCT/JP2020/007795, filed on Feb. 26, 2020.

(30) Foreign Application Priority Data

Feb. 27, 2019 (JP) .............................. JP2019-034417

(51) Int. Cl.
  *C10M 107/38* (2006.01)
  *C10M 177/00* (2006.01)
  *C10N 50/02* (2006.01)

(52) U.S. Cl.
  CPC ........ *C10M 107/38* (2013.01); *C10M 177/00* (2013.01); *C10M 2213/0606* (2013.01); *C10N 2050/02* (2013.01)

(58) Field of Classification Search
  CPC ............ C10N 2040/22; C10N 2050/02; C10N 2020/085; C10N 2040/06; C10N 2030/22; C10N 2040/14; C10N 2020/083; C10N 2040/20; C09D 7/63; C09D 201/00; C09D 7/20; C09D 7/40; C11D 7/50; C11D 7/263; C11D 7/5018; C11D 11/0047; C11D 11/00; C11D 7/30; C23G 5/02806; C23G 5/028; C07C 21/073; C07C 19/08; C07C 23/10; C07C 43/123; B08B 3/08; C10M 107/38; C10M 107/50; C10M 2213/0606; C10M 2229/025

See application file for complete search history.

(56) References Cited

U.S. PATENT DOCUMENTS

| | | | |
|---|---|---|---|
| 2016/0137878 A1* | 5/2016 | Yamane | C09D 171/00 528/36 |
| 2018/0187134 A1* | 7/2018 | Nakamura | C23G 5/02841 |
| 2018/0319726 A1* | 11/2018 | Mitsuoka | C09K 5/044 |

FOREIGN PATENT DOCUMENTS

| | | |
|---|---|---|
| CN | 101351537 A | 1/2009 |
| JP | 2016-169256 A | 9/2016 |
| JP | 2017-42533 A | 3/2017 |
| WO | WO 2013/028943 A2 | 2/2013 |
| WO | WO-2017038933 A1 * | 3/2017 ............... B08B 3/08 |
| WO | WO 2017/122801 A1 | 7/2017 |

OTHER PUBLICATIONS

International Search Report dated May 19, 2020 in PCT/JP2020/007795, filed on Feb. 26, 2020, 2 pages.

* cited by examiner

*Primary Examiner* — Vishal V Vasisth
(74) *Attorney, Agent, or Firm* — Oblon, McClelland, Maier & Neustadt, L.L.P.

(57) ABSTRACT

To provide a lubricant solution capable of forming a uniform coating film by using a solvent composition which has a small impact on the global environment and which is excellent in solubility of the fluorinated ether compound, and a method for producing a substrate provided with a lubricant coating film.
A lubricant solution comprising a solvent composition which comprises a HCFO and at least one member selected from the group consisting of 1,1,1,2,2,3,3,4,4,5,5,6,6-tridecafluorohexane, 1,1,1,2,2,3,3,4,4,5,5,6,6-tridecafluorooctane, nonafluorobutyl methyl ether, nonafluorobutyl ethyl ether and 3-methoxy-4-trifluoromethyl-1,1,1,2,2,3,4,5,5,5-decafluoropentane, and a fluorinated ether compound which is a fluorinated ether compound having a perfluoropolyether chain and $CF_3$ groups at both terminals, wherein the perfluoropolyether chain does not have a branched structure.

6 Claims, No Drawings

LUBRICANT SOLUTION, METHOD FOR PRODUCING SUBSTRATE PROVIDED WITH LUBRICANT COATING FILM

This application is a CON of PCT/JP2020/007795 filed Feb. 26, 2020.

TECHNICAL FIELD

The present invention relates to a lubricant solution, and a method for producing a substrate provided with a lubricant coating film.

BACKGROUND ART

Heretofore, as solvents to dilute lubricants, a chlorofluorocarbon (hereinafter referred to as CFC) and a hydrochlorofluorocarbon (hereinafter referred to as HCFC) have been used, since they are non-flammable and are excellent in chemical and thermal stability. However, since CFC and HCFC bring about adverse effects to the ozone layer, their production is scheduled to be phased out in 2020 in developed countries.

As solvents that do not bring about adverse effects to the ozone layer, a perfluorocarbon (hereinafter referred to as PFC), a hydrofluorocarbon (hereinafter referred to as HFC), a hydrofluoroether (hereinafter referred to as HFE), etc. are known. However, HFC, HFE and PFC have a high global warming potential, and therefore, a solvent having a small impact on the global environment has been desired.

As a solvent having a small impact on the global environment and being excellent in solubility of lubricants, a hydrochlorofluoroolefin, such as 1-chloro-3,3,3-trifluoropropene (HCFO-1233zd) or 1-chloro-2,3,3-trifluoropropene (HCFO-1233yd), has been proposed (Patent Documents 1 and 2).

On the other hand, as a fluorinated lubricant, a fluorinated ether compound having a perfluorinated polyether chain, is known.

PRIOR ART DOCUMENTS

Patent Documents

Patent Document 1: WO2013/028943
Patent Document 2: WO2017/122801

DISCLOSURE OF INVENTION

Technical Problem

However, a hydrochlorofluoroolefin has sometimes been insufficient in solubility of a lubricant when the lubricant is a fluorinated ether compound having a perfluoropolyether chain and $CF_3$ groups at both terminals, wherein the perfluoropolyether chain does not have branched structure.

Therefore, the present invention has an object to provide a lubricant solution capable of forming a uniform coating film by using a solvent composition having a small impact on the global environment and being excellent in solubility of the above fluorinated ether compound, and a method for producing a substrate provided with a lubricant coating film.

Solution to Problem

As a result of diligent study, the present inventors have accomplished the present invention. That is, the present invention is represented by the following [1] to [8].

A lubricant solution comprising a solvent composition which comprises a hydrochlorofluoroolefin and at least one member selected from the group consisting of 1,1,1,2,2,3,3,4,4,5,5,6,6-tridecafluorohexane, 1,1,1,2,2,3,3,4,4,5,5,6,6-tridecafluorooctane, nonafluorobutyl methyl ether, nonafluorobutyl ethyl ether and
3-methoxy-4-trifluoromethyl-1,1,1,2,2,3,4,5,5,5-decafluoropentane, and
a fluorinated ether compound which is a fluorinated ether compound having a perfluoropolyether chain and $CF_3$ groups at both terminals, wherein the perfluoropolyether chain does not have a branched structure.

The lubricant solution according to [1], wherein the content proportion of the hydrochlorofluoroolefin to the total amount of the solvent composition is from 70 to 99 mass %, and the content proportion of the total of 1,1,1,2,2,3,3,4,4,5,5,6,6-tridecafluorohexane, 1,1,1,2,2,3,3,4,4,5,5,6,6-tridecafluorooctane, nonafluorobutyl methyl ether, nonafluorobutyl ethyl ether and
3-methoxy-4-trifluoromethyl-1,1,1,2,2,3,4,5,5,5-decafluoropentane, to the total amount of the solvent composition, is from 1 to 30 mass %.

The lubricant solution according to [1] or [2], wherein the hydrochlorofluoroolefin is at least one member selected from the group consisting of 1-chloro-2,3,3-trifluoropropene, 1-chloro-3,3,3-trifluoropropene, 1-chloro-2,3,3,4,4,5,5-heptafluoro-1-pentene and 1,3-dichloro-2,3,3-trifluoropropene.

The lubricant solution according to any one of [1] to [3], wherein the fluorinated ether compound is a compound represented by the following formula (I):

$$Z_1-Y-X-Z_2 \quad (I)$$

where k, l, m, and n are each independently an integer of from 0 and 200, k+l+m+n is from 5 to 200, and
* represents the bond position on the Y side; Y is a single bond or an oxygen atom; $Z_1$ is a fluorine atom or a $C_{1-3}$ perfluoroalkyl group, and when $Z_1$ is a fluorine atom, Y is a single bond; and $Z_2$ is a $C_{1-3}$ perfluoroalkyl group.

The lubricant solution according to [4], wherein the compound represented by the formula (I) is a compound represented by the following formula (I-a) or the following formula (I-b):

in the formula (I-a), p is an integer of from 10 to 60.

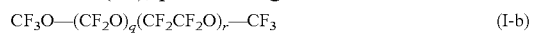

in the formula (I-b), q+r=40 to 180, and q/r=0.5 to 2.

The lubricant solution according to any one of [1] to [5], wherein the content proportion of the fluorinated ether compound to the total amount of the lubricant solution is from 0.1 to 50 mass %.

A method for producing a substrate provided with a lubricant coating film, which comprises applying the lubricant solution as defined in any one of [1] to [6] to a substrate, and then evaporating the solvent composition to form a coating film of the fluorinated ether compound on the surface of the substrate.

The production method according to [7], wherein the solvent composition is evaporated at a temperature of from 20 to 100° C.

Advantageous Effects of Invention

The lubricant solution of the present invention has a small impact on the global environment and is capable of forming a uniform coating film.

The method for producing a substrate provided with a lubricant coating film of the present invention has a small impact on the global environment and is capable of producing a substrate provided with a lubricant coating film, having a uniform lubricant coating film.

DESCRIPTION OF EMBODIMENTS

In this specification, with respect to a halogenated hydrocarbon, the abbreviation of the compound is written in parentheses after the compound name, but in this specification, as the case requires, the abbreviation is used instead of the compound name. As the abbreviation, only the numeric and lowercase alphabetic portions after the hyphen (-) (e.g. "1233zd" in "HCFO-1233zd") may sometimes be used. Further, (E) attached to the name or abbreviation of a compound with geometric isomers indicates the E-isomer, and (Z) indicates the Z-isomer. In the name or abbreviation of a compound, in a case where no E- or Z-isomer is specified, the name or abbreviation means a generic term that includes the E-isomer, the Z-isomer, and a mixture of the E- and Z-isomers.

In this specification, a compound in which some of the hydrogen atoms of a saturated hydrocarbon compound are replaced with fluorine atoms is called a hydrofluorocarbon (HFC), a compound in which some of the hydrogen atoms of a saturated hydrocarbon compound are replaced with fluorine and chlorine atoms is called a hydrochlorofluorocarbon (HCFC), a compound in which all of the hydrogen atoms of a saturated hydrocarbon compound are replaced with fluorine and chlorine atoms is called a chlorofluorocarbon (CFC), a compound in which all of the hydrogen atoms of a saturated hydrocarbon compound are replaced with fluorine atoms is called a perfluorocarbon (PFC), a compound having a carbon-carbon double bond and consisting of carbon atoms, fluorine atoms and hydrogen atoms, is called a hydrofluoroolefin (HFO), a compound having a carbon-carbon double bond and consisting of carbon atoms, chlorine atoms, fluorine atoms and hydrogen atoms, is called a hydrochlorofluoroolefin (HCFO), a compound having a carbon-carbon double bond and consisting of carbon atoms and fluorine atoms, is called a perfluoroolefin (PFO), and a compound having a carbon-carbon double bond and consisting of carbon atoms, chlorine atoms and fluorine atoms, is called a chlorofluoroolefin (CFO).

In this specification, a compound represented by a formula is also denoted as a compound with the number of that formula. For example, a compound represented by the formula (I) is also denoted as compound (1).

[Lubricant Solution]

The lubricant solution of the present invention comprises a solvent composition which comprises a hydrochlorofluoroolefin and at least one member selected from the group (hereinafter collectively referred to as solvent (B)) consisting of 1,1,1,2,2,3,3,4,4,5,5,6,6-tridecafluorohexane, 1,1,1,2, 2,3,3,4,4,5,5,6,6-tridecafluorooctane, nonafluorobutyl methyl ether, nonafluorobutyl ethyl ether and 3-methoxy-4-trifluoromethyl-1,1,1,2,2,3,4,5,5,5-decafluoropentane, and a fluorinated ether compound (hereinafter referred to also as fluorinated ether compound (A)) which is a fluorinated ether compound having a perfluoropolyether chain and $CF_3$ groups at both terminals, wherein the perfluoropolyether chain does not have a branched structure.

The present inventors have found that when a hydrochlorofluoroolefin is used alone, the fluorinated ether compound (A) cannot be dissolved in some cases, but when a solvent composition comprising a hydrochlorofluoroolefin and solvent (B), is used, the solvent composition is excellent in solubility of the fluorinated ether compound (A).

The lubricant solution of the present invention comprises a fluorinated ether compound (A) and the above solvent composition, whereby the fluorinated ether compound (A) is dissolved in the solvent composition, and thus, it is possible to form a uniform coating film on a substrate.

<Fluorinated Ether Compound (A)>

The lubricant solution of the present invention contains a fluorinated ether compound (A). The fluorinated ether compound may be either liquid or solid, but usually a liquid one is used.

As the fluorinated ether compound (A), a compound represented by the following formula (I) is preferred:

$$Z_1-Y-X-Z_2 \quad (I)$$

X is $*-(CF_2O)_k-(C_2F_4O)_l-(C_3F_6O)_m-(C_4F_8O)_n-$, where k, l, m and n are each independently an integer of from 0 and 200, and k+l+m+n is from 5 to 200. Here, * represents the bond position on the Y side.

Y is a single bond or an oxygen atom, $Z_1$ is a fluorine atom or a $C_{1-3}$ perfluoroalkyl group, and when $Z_1$ is a fluorine atom, Y is a single bond. $Z_2$ is a $C_{1-3}$ perfluoroalkyl group.

The respective repeating units of X may be present in blocks, alternating or at random.

As the compound represented by the above formula (I), a compound represented by the following formula (I-a) or formula (I-b) (hereinafter referred to also as compound (I-a) or compound (I-b)) is preferred.

$$F-(C_3F_6O)_p-C_2F_5 \quad (I\text{-}a)$$

In the formula (I-a), p is an integer of from 10 and 60.

$$CF_3O-(CF_2O)q(CF_2CF_2O)_r-CF_3 \quad (I\text{-}b)$$

In the formula (I-b), q+r=40 to 180, and q/r=0.5 to 2.

The mass average molecular weight of the fluorinated ether compound (A) is preferably from 2,000 to 30,000, more preferably from 3,000 to 10,000.

As commercial products of compound (I-a), Demnum S-20, S-65 and S-200 (manufactured by Daikin Industries Ltd.), etc. may be mentioned.

As commercial products of compound (I-b), Fomblin M lubricants M03, M07, M15, M30, M60 and M100 (manufactured by Solvay Specialty Polymers, Inc.), etc. may be mentioned.

The content proportion of the fluorinated ether compound (A) to the total amount of the lubricant solution is preferably from 0.1 to 50 mass %, more preferably from 0.1 to 40 mass %, further preferably from 0.1 to 30 mass %.

When the content proportion of the fluorinated ether compound (A) is within the above range, it will be easy to adjust the thickness of the coating film of the fluorinated ether compound (A) to be within a proper range.

<Solvent Composition>

The solvent composition to be used in the present invention comprises HCFO and solvent (B). The solvent composition to be used in the present invention may contain components other than HCFO and solvent (B) to such an extent that the effects of the present invention are not impaired.

(HCFO)

HCFO is an olefin having a double bond between carbon-carbon atoms, whereby it has a short lifetime in the atmosphere and a low global warming potential (GWP). The lubricant solution of the present invention contains HCFO, whereby it has a small impact on the global environment.

As HCFO, HCFO having from 3 to 5 carbon atoms is preferred, such as monochlorotetrafluoropropene, monochlorotrifluoropropene, dichlorotrifluoropropene, dichlorodifluoropropene, trichloromonofluoropropene, dichlorotrifluoropropene or monochloroheptafluoropentene.

Specific examples of HCFO may be 1-chloro-2,3,3,3-tetrafluoropropene (HCFO-1224yd), 2-chloro-1,3,3,3-tetrafluoropropene (HCFO-1224xe), 1-chloro-1,3,3,3-tetrafluoropropene (HCFO-1224zb), 2-chloro-3,3,3-trifluoropropene (HCFO-1233xf), 1-chloro-2,3,3-trifluoropropene (HCFO-1233yd), 1-chloro-3,3,3-trifluoropropene (HCFO-1233zd), 1-chloro-1,3,3-trifluoropropene (HCFO-1233zb), 2-chloro-1,3,3-trifluoropropene (HCFO-1233xe), 2-chloro-1,1,3-trifluoropropene (HCFO-1233xc), 3-chloro-1,2,3-trifluoropropene (HCFO-1233ye), 3-chloro-1,1,2-trifluoropropene (HCFO-1233yc), 1,2-dichloro-3,3,3-trifluoropropene (HCFO-1223xd), 2,3-dichloro-3,3-difluoropropene (HCFO-1232xf), 1,2,3-trichloro-3,3-difluoropropene (HCFO-1222xd), 2,3-dichloro-1,1-difluoropropene (HCFO-1232xc), 2,3,3-trichloro-3-fluoropropene (HCFO-1231xf), 1,3-dichloro-2,3,3-trifluoropropene (HCFO-1223yd), 1-chloro-2,3,3,4,4,5,5-heptafluoro-1-pentene (HCFO-1437dycc), etc.

As HCFO, from such a viewpoint that the solubility of an organic compound is excellent, and it has a boiling point suitable for use in a lubricant solution, 1233yd, 1233zd, 1223yd and 1437dycc are preferred, and 1233yd, 1233zd (Z), 1223yd and 1437dycc are more preferred, and from such a viewpoint that the solubility of a fluorinated ether compound (A) is excellent even if the amount of solvent (B) is small, 1233zd(Z) and 1437dycc are particularly preferred, and 1437dycc is most preferred. As HCFO, one compound may be used, or two or more compounds may be used.

Among the above-mentioned HCFOs, with respect to 1224yd, 1224xe, 1224zb, 1233yd, 1233zb, 1233zd, 1223xd, 1233xe, 1233ye, 1222xd, and 1437dycc, Z- and E-isomers are present. These compounds may be used as the E- or Z-isomer alone, or as a mixture of the E- and Z-isomers.

For example, in a case where 1233zd is to be used as HCFO, the mass ratio (1233zd(Z)/1233zd(E)) of 1233zd(Z) to 1233zd(E) is preferably from 95/5 to 100/0.

For example, in a case where 1233yd is to be used as HCFO, the mass ratio (1233yd(Z)/1233yd(E)) of 1233yd(Z) to 1233yd(E) is preferably from 90/10 to 100/0.

For example, in a case where 1437dycc is to be used as HCFO, the mass ratio (1437dycc(Z)/1437dycc(E)) of 1437dycc(Z) to 1437dycc(E) is preferably from 95/5 to 100/0.

A commercial product of 1233zd(Z) may be Celefin 1233Z (manufactured by Central Glass Co., Ltd.).

The content proportion of HCFO to the total amount of the solvent composition to be used in the present invention, is preferably from 70 to 99 mass %, more preferably from 75 to 98 mass %, further preferably from 80 to 97 mass %.

(Solvent (B))

Solvent (B) is 1,1,1,2,2,3,3,4,4,5,5,6,6-tridecafluorohexane, 1,1,1,2,2,3,3,4,4,5,5,6,6-tridecafluorooctane, nonafluorobutyl methyl ether nonafluorobutyl ethyl ether, and 3-methoxy-4-trifluoromethyl-1,1,1,2,2,3,4,5,5,5-decafluoropentane. As solvent (B), one compound of the above may be used alone, or two or more compounds may be used in combination. As the lubricant solution of the present invention contains solvent (B), the solubility of the fluorinated ether compound (A) is improved.

As solvent (B), 1,1,1,2,2,3,3,4,4,5,5,6,6-tridecafluorohexane is preferred from such a viewpoint that the solubility of the fluorinated ether compound (A) is particularly excellent.

As a commercial product of 1,1,1,2,2,3,3,4,4,5,5,6,6-tridecafluorohexane, AC-2000 (manufactured by AGC Inc.) may be mentioned; as a commercial product of 1,1,1,2,2,3,3,4,4,5,5,6,6-tridecafluorooctane, AC-6000 (manufactured by AGC Inc.) may be mentioned; as a commercial product of nonafluorobutyl methyl ether, Novec 7100 (manufactured by 3M) may be mentioned; as a commercial product of nonafluorobutyl ethyl ether, Novec 7200 (manufactured by 3M) may be mentioned; and as a commercial product of 3-methoxy-4-trifluoromethyl-1,1,1,2,2,3,4,5,5,5-decafluoropentane, Novec 7300 (manufactured by 3M) may be mentioned.

The content proportion of solvent (B) to the total amount of the solvent composition to be used in the present invention is preferably from 1 to 30 mass %, more preferably from 2 to 25 mass %, further preferably from 3 to 20 mass %.

The solvent composition to be used in the present invention may contain additional components other than HCFO and solvent (B), for various purposes, such as increasing solubility and adjusting the evaporation rate.

Preferred examples of the components other than HCFO and solvent (B) may be hydrocarbons (but excluding HFCs), alcohols, ketones, ethers (but excluding HFEs), esters, chlorocarbons, HFCs, and HFEs (but excluding solvent (B)).

As the hydrocarbons, hydrocarbons having 5 or more carbon atoms are preferred. The hydrocarbons may be chain-like or cyclic, and may be saturated or unsaturated hydrocarbons.

The hydrocarbons may be n-pentane, 2-methylbutane, n-hexane, 2-methylpentane, 2,2-dimethylbutane, 2,3-dimethylbutane, n-heptane, 2-methylhexane, 3-methylhexane, 2,4-dimethylpentane, n-octane, 2-methylheptane, 3-methylheptane, 4-methylheptane, 2,2-dimethylhexane, 2,5-dimethylhexane, 3,3-dimethylhexane, 2-methyl-3-ethylpentane, 3-methyl-3-ethylpentane, 2,3,3-trimethylpentane, 2,3,4-trimethylpentane, 2,2,3-trimethylpentane, 2-methylheptane, 2,2,4-trimethylpentane, n-nonane, 2,2,5-trimethylhexane, n-decane, n-dodecane, 2-methyl-2-butene, 1-pentene, 2-pentene, 1-hexene, 1-octene, 1-nonene, 1-decene, cyclopentane, methylcyclopentane, cyclohexane, methylcyclohexane, ethylcyclohexane, bicyclohexane, cyclohexene, a-pinene, dipentene, decalin, tetralin, amylnaphthalene, etc., and n-pentane, cyclopentane, n-hexane, cyclohexane, and n-heptane are preferred.

As the alcohols, $C_{1-16}$ alcohols are preferred. The alcohols may be chain-like or cyclic, and may be saturated or unsaturated alcohols. The alcohols may be methanol, ethanol, n-propyl alcohol, isopropyl alcohol, n-butyl alcohol, sec-butyl alcohol, isobutyl alcohol, tert-butyl alcohol, 1-pentanol, 2-pentanol, 1-ethyl-1-propanol, 2-methyl-1-butanol, 3-methyl-1-butanol, 3-methyl-2-butanol, neopentyl alcohol, 1-hexanol, 2-methyl-1-pentanol, 4-methyl-2-pentanol, 2-ethyl-1-butanol, 1-heptanol, 2-heptanol, 3-heptanol, 1-octanol, 2-octanol, 2-ethyl-1-hexanol, 1-nonanol, 3,5,5-trimethyl-1-hexanol, 1-decanol, 1-undecanol, 1-dodecanol, allyl alcohol, propargyl alcohol, benzyl alcohol, cyclohexanol, 1-methylcyclohexanol, 2-methylcyclohexanol, 3-methylcyclohexanol, 4-methylcyclohexanol, a-terpineol, 2,6-dimethyl-4-heptanol, nonyl alcohol, tetradecyl alcohol, etc., and methanol, ethanol and isopropyl alcohol are preferred.

As the ketones, $C_{3-9}$ ketones are preferred. The ketones may be chain-like or cyclic, and may be saturated or unsaturated ketones.

The ketones may be acetone, methyl ethyl ketone, 2-pentanone, 3-pentanone, 2-hexanone, methyl isobutyl ketone, 2-heptanone, 3-heptanone, 4-heptanone, diisobutyl ketone, mesityl oxide, holon, 2-octanone, cyclohexanone, methylcyclohexanone, isophorone, 2,4-pentanedione, 2,5-hexanedione, diacetone alcohol, acetophenone, etc., and acetone and methyl ethyl ketone are preferred.

As the ethers, $C_{2-8}$ ethers are preferred. The ethers may be chain-like or cyclic, and may be saturated or unsaturated ethers.

The ethers may be diethyl ether, dipropyl ether, diisopropyl ether, dibutyl ether, ethyl vinyl ether, butyl vinyl ether, anisole, phenethol, methyl anisole, furan, methyl furan, tetrahydrofuran, etc., and diethyl ether, diisopropyl ether and tetrahydrofuran are preferred.

As the esters, $C_{2-19}$ esters are preferred. The esters may be chain-like or cyclic, and may be saturated or unsaturated esters.

The esters may be methyl formate, ethyl formate, propyl formate, butyl formate, isobutyl formate, pentyl formate, methyl acetate, ethyl acetate, propyl acetate, isopropyl acetate, butyl acetate, isobutyl acetate, sec-butyl acetate, pentyl acetate, methoxybutyl acetate, sec-hexyl acetate, 2-ethylbutyl acetate, 2-ethylhexyl acetate, cyclohexyl acetate, benzyl acetate, methyl propionate, ethyl propionate, butyl propionate, methyl butyrate, ethyl butyrate, butyl butyrate, isobutyl isobutyrate, ethyl 2-hydroxy-2-methylpropionate, methyl benzoate, ethyl benzoate, propyl benzoate, butyl benzoate, benzyl benzoate, γ-butyrolactone, diethyl oxalate, dibutyl oxalate, dipentyl oxalate, diethyl malonate, dimethyl maleate, diethyl maleate, dibutyl maleate, dibutyl tartrate, tributyl citrate, dibutyl sebacate, dimethyl phthalate, diethyl phthalate, dibutyl phthalate, etc., and methyl acetate and ethyl acetate are preferred.

As the chlorocarbons, $C_{1-3}$ chlorocarbons are preferred. The chlorocarbons may be chain-like or cyclic, and may be saturated or unsaturated chlorocarbons.

The chlorocarbons may be methylene chloride, 1,1-dichloroethane, 1,2-dichloroethane, 1,1,2-trichloroethane, 1,1,1,2-tetrachloroethane, 1,1,2,2-tetrachloroethane, pentachloroethane, 1,1-dichloroethylene, cis-1,2-dichloroethylene, trans-1,2-dichloroethylene, trichloroethylene, tetrachloroethylene, 1,2-dichloropropane, etc., and methylene chloride, trans-1,2-dichloroethylene and trichloroethylene are more preferred.

As the HFCs, $C_{4-8}$ chain or cyclic HFCs are preferred, and HFCs in which the number of fluorine atoms in one molecule is at least the number of hydrogen atoms, are more preferred.

The HFCs may be 1,1,1,3,3-pentafluorobutane, 1,1,1,2,2,3,4,5,5,5-decafluoropentane, 1,1,2,2,3,3,4-heptafluorocyclopentane, 1,1 1,2,2,3,3,4,4-nonafluorohexane, 1,1,1,2,2,3,3,4,4,5,5,6,6-tridecafluorohexane, 1,1,1,2,2,3,3,4,4,5,5,6,6-tridecafluorooctane, etc., and 1,1,1,2,2,3,4,5,5,5-decafluoropentane, 1,1,1,2,2,3,3,4,4-nonafluorohexane and 1,1,1,2,2,3,3,4,4,5,5,6,6-tridecafluorohexane are preferred.

As the HFEs, 1,1,2,2-tetrafluoroethoxy-1-(2,2,2-trifluoro)ethane, etc. are preferred.

One compound of the above may be used alone, or two or more compounds may be used in combination.

The content proportion of the components other than HCFO and solvent (B) to the total amount of the solvent composition to be used in the present invention is preferably at most 10 mass %, more preferably at most 5 mass %.

The content proportion of the solvent composition to the total amount of the lubricant solution is preferably from 50 to 99.9 mass %, more preferably from 60 to 99.9 mass %, further preferably from 70 to 99.9 mass %.

The proportion of the total amount of HCFO and solvent (B) to the total amount of the solvent composition is preferably from 80 to 100 mass %, more preferably from 90 to 100 mass %, further preferably from 95 to 100 mass %, from the viewpoint of being able to achieve the effects of the invention.

As the solvent composition to be used in the present invention, preferred is a solvent composition comprising 1437dycc and solvent (B), wherein the mass ratio of 1437dycc to solvent (B) is from 91/9 to 85/15, and the proportion of the total amount of 1437dycc and solvent (B) to the total amount of the solvent composition is at least 80 mass %; a solvent composition comprising 1233yd and solvent (B), wherein the mass ratio of 1233yd to solvent (B) is from 99/1 to 85/15, and the proportion of the total amount of 1233yd and solvent (B) to the total amount of the solvent composition is at least 80 mass %; or a solvent composition comprising 1233zd (Z) and solvent (B), wherein the mass ratio of 1233zd (Z) to solvent (B) is from 99/1 to 70/30, and the proportion of the total amount of 1233zd (Z) and solvent (B) to the total amount of the solvent composition is at least 80 mass %.

The lubricant solution of the present invention may contain components other than the fluorinated ether compound (A) and the solvent composition, within such a range that the effects of the present invention are not impaired. Specifically, silicone lubricants, fluorinated lubricants other than the fluorinated ether compound (A), and stabilizers may be mentioned. The content proportion of the components other than the fluorinated ether compound (A) and the solvent composition to the total amount of the lubricant solution, is preferably at most 15 mass %, more preferably at most 10 mass %, further preferably at most 5 mass %.

In a case where the lubricant solution of the present invention contains a silicone lubricant, the content proportion of the silicone lubricant is preferably at most 15 mass %, more preferably at most 10 mass %, further preferably at most 5 mass %, to the total amount of the lubricant solution.

In a case where the lubricant solution of the present invention contains a fluorinated lubricant other than the fluorinated ether compound (A), the content proportion of the fluorinated lubricant other than the fluorinated ether compound (A) is preferably at most 15 mass %, more preferably at most 10 mass %, further preferably at most 5 mass %, to the total amount of the lubricant solution.

In a case where the lubricant solution of the present invention contains a stabilizer, the content proportion of the stabilizer is preferably at most 3 mass %, more preferably at most 1 mass %, further preferably at most 0.1 mass %, to the total amount of the lubricant solution.

[Method for Producing Substrate Provided with Lubricant Coating Film]

The method for producing a substrate provided with a lubricant coating film of the present invention, comprises applying the lubricant solution of the present invention to a substrate, and then evaporating the solvent composition to form a coating film of the fluorinated ether compound (A) on the surface of the substrate.

As the substrate, a variety of materials such as metal, resin, rubber, glass, ceramics, and composites of these materials, may be mentioned.

As the application method of the lubricant solution, for example, application by brushing, application by spraying, or application by immersing the substrate in the lubricant solution, may be mentioned. At the time of the application to the substrate, the lubricant solution of the present invention may be used as it is, or one having further been diluted with a solvent may be used.

As the evaporation method, for example, air drying, or drying by heating may be mentioned. The drying temperature is preferably from 20 to 100° C.

The method for producing a substrate provided with a lubricant coating film of the present invention uses a solvent composition which has a small impact on the global environment and which is excellent in solubility of the above fluorinated ether compound (A), whereby it is possible to form a uniform lubricant coating film.

EXAMPLES

<Example of Production of 1437dycc>

Into a 0.2 L four-necked flask equipped with a stirrer and a Dimroth condenser, 100.7 g of 448occc and 1.0 g of tetra-n-butylammonium bromide (TBAB) as a phase transfer catalyst were added, and the flask was cooled to 10° C. While maintaining the reaction temperature at 10° C., 153.9 g of a 34 mass % potassium hydroxide (KOH) aqueous solution was added dropwise over 30 minutes. Then, the stirring was continued for 38 hours. The obtained reaction solution was separated into two phases, organic phase and aqueous phase, and the organic phase was recovered.

The recovered organic phase was purified to obtain 78.6 g of an isomer mixture of 1437dycc(Z) and 1437dycc(E) with a purity of 99.5%. Here, the mass ratio (1437dycc(Z)/1437dycc(E)) of 1437dycc(Z) to 1437dycc(E) in the isomer mixture was 99/1.

<Example of Production of 1233yd>

As 1233yd, an isomer mixture wherein the mass ratio of 1233yd (Z) to 1233yd (E) was 95/5, produced by the method described in WO2018/092780, was used.

<Solubility Test of Fluorinated Ether Compound (A)>

The solubility test of a fluorinated ether compound (A) will be described below. Ex. 2 to 5, 7 to 18, 20 to 27 and 29 to 45 are Examples of the present invention, and Ex. 1, 6, 19 and 28 are Comparative Examples. A fluorinated ether compound (A) and a solvent composition were mixed at room temperature in predetermined proportions to prepare a lubricant solution. The details of the lubricant solution subjected to the evaluation are shown in Tables 1 and 2. Here, the fluorinated ether compound (A), HCFO and solvent (B) shown in Tables 1 and 2 are as follows. Further, the proportion of the fluorinated ether compound (A) in Tables 1 and 2 is the content proportion of the fluorinated ether compound (A) to the total amount of the lubricant solution.

(Fluorinated Ether Compound (A))

Fomblin M03: Fomblin M lubricant M03 (manufactured by Solvay Specialty Polymers, Inc.); Fomblin M15: Fomblin M lubricant M15 ((manufactured by Solvay Specialty Polymers, Inc.)

(HCFO)

1437dycc: An isomer mixture wherein the mass ratio (1437dycc(Z)/1437dycc(E)) of 1437dycc(Z) to 1437dycc (E) is 99/1

1233zd(Z): "1233Z" (manufactured by Central Glass Co., Ltd.)

(Solvent (B))

AC-2000: "AC-2000" (manufactured by AGC Inc.)
AC-6000: "AC-6000" (manufactured by AGC Inc.)
HFE-7100: "Novec 7100" (manufactured by 3M)
HFE-7200: "Novec 7200" (manufactured by 3M)

The state of each lubricant solution was observed by the naked eyes and evaluated according to the following standards. The results are shown in Tables 1 and 2. ○ (Excellent): No cloudiness is observed. Δ (Good): No practical problem, although a thin cloudiness is observed. x (Poor): Cloudiness or separation is clearly observed.

TABLE 1

| Ex. | Fluorinated ether compound (A) Type | Amount used (g) | Solvent composition (mass %) HCFO 1437dycc | 1233zd(Z) | Solvent (B) AC-2000 | AC-6000 | HFE-7100 | HFE-7200 | Amount used (g) | Proportion of fluorinated ether compound (A) (mass %) | Solubility |
|---|---|---|---|---|---|---|---|---|---|---|---|
| Ex. 1 | Fomblin M03 | 0.05 | 100 | | | | | | 5 | 1.0 | x |
| Ex. 2 | Fomblin M03 | 0.05 | 91 | | 9 | | | | 5 | 1.0 | ○ |
| Ex. 3 | Fomblin M03 | 0.05 | 91 | | | 9 | | | 5 | 1.0 | ○ |
| Ex. 4 | Fomblin M03 | 0.05 | 91 | | | | 9 | | 5 | 1.0 | ○ |
| Ex. 5 | Fomblin M03 | 0.05 | 91 | | | | | 9 | 5 | 1.0 | ○ |
| Ex. 6 | Fomblin M15 | 0.05 | 100 | | | | | | 5 | 1.0 | x |
| Ex. 7 | Fomblin M15 | 0.05 | 91 | | 9 | | | | 5 | 1.0 | ○ |
| Ex. 8 | Fomblin M15 | 0.05 | 91 | | | 9 | | | 5 | 1.0 | ○ |
| Ex. 9 | Fomblin M15 | 0.05 | 91 | | | | 9 | | 5 | 1.0 | ○ |
| Ex. 10 | Fomblin M15 | 0.05 | 91 | | | | | 9 | 5 | 1.0 | ○ |
| Ex. 11 | Fomblin M15 | 0.1 | 85 | | 15 | | | | 5 | 2.0 | ○ |
| Ex. 12 | Fomblin M15 | 0.1 | 85 | | | 15 | | | 5 | 2.0 | ○ |

TABLE 1-continued

| Ex. | Fluorinated ether compound (A) Type | Amount used (g) | Solvent composition (mass %) HCFO 1437dycc | 1233zd(Z) | Solvent (B) AC-2000 | AC-6000 | HFE-7100 | HFE-7200 | Amount used (g) | Proportion of fluorinated ether compound (A) (mass %) | Solubility |
|---|---|---|---|---|---|---|---|---|---|---|---|
| Ex. 13 | Fomblin M15 | 0.1 | | 85 | | | 15 | | 5 | 2.0 | ○ |
| Ex. 14 | Fomblin M15 | 0.1 | | 85 | | | | 15 | 5 | 2.0 | ○ |
| Ex. 15 | Fomblin M15 | 2.0 | | 85 | 15 | | | | 5 | 29 | ○ |
| Ex. 16 | Fomblin M15 | 2.0 | | 85 | | 15 | | | 5 | 29 | ○ |
| Ex. 17 | Fomblin M15 | 2.0 | | 85 | | | 15 | | 5 | 29 | ○ |
| Ex. 18 | Fomblin M15 | 2.0 | | 85 | | | | 15 | 5 | 29 | ○ |

TABLE 2

| Ex. | Fluorinated ether compound (A) Type | Amount used (g) | Solvent composition (mass %) HCFO 1437dycc | 1233zd(Z) | Solvent (B) AC-2000 | AC-6000 | HFE-7100 | HFE-7200 | Amount used (g) | Proportion of fluorinated ether compound (A) (mass %) | Solubility |
|---|---|---|---|---|---|---|---|---|---|---|---|
| Ex. 19 | Fomblin M03 | 0.05 | | 100 | | | | | 5.0 | 1.0 | x |
| Ex. 20 | Fomblin M03 | 0.05 | | 75 | 25 | | | | 5.0 | 1.0 | ○ |
| Ex. 21 | Fomblin M03 | 0.05 | | 75 | | 25 | | | 5.0 | 1.0 | ○ |
| Ex. 22 | Fomblin M03 | 0.05 | | 75 | | | 25 | | 5.0 | 1.0 | ○ |
| Ex. 23 | Fomblin M03 | 0.05 | | 70 | | | | 30 | 5.0 | 1.0 | ○ |
| Ex. 24 | Fomblin M03 | 0.1 | | 70 | 30 | | | | 5.0 | 2.0 | ○ |
| Ex. 25 | Fomblin M03 | 0.1 | | 70 | | 30 | | | 5.0 | 2.0 | ○ |
| Ex. 26 | Fomblin M03 | 0.1 | | 70 | | | 30 | | 5.0 | 2.0 | ○ |
| Ex. 27 | Fomblin M03 | 0.1 | | 70 | | | | 30 | 5.0 | 2.0 | ○ |
| Ex. 28 | Fomblin M15 | 0.05 | | 100 | | | | | 5.0 | 1.0 | x |
| Ex. 29 | Fomblin M15 | 0.05 | | 75 | 25 | | | | 5.0 | 1.0 | ○ |
| Ex. 30 | Fomblin M15 | 0.05 | | 75 | | 25 | | | 5.0 | 1.0 | ○ |
| Ex. 31 | Fomblin M15 | 0.05 | | 75 | | | 25 | | 5.0 | 1.0 | ○ |
| Ex. 32 | Fomblin M15 | 0.05 | | 73 | 27 | | | | 5.0 | 1.0 | ○ |
| Ex. 33 | Fomblin M15 | 0.05 | | 73 | | 27 | | | 5.0 | 1.0 | ○ |
| Ex. 34 | Fomblin M15 | 0.05 | | 73 | | | 27 | | 5.0 | 1.0 | ○ |
| Ex. 35 | Fomblin M15 | 0.05 | | 73 | | | | 27 | 5.0 | 1.0 | ○ |
| Ex. 36 | Fomblin M15 | 0.05 | | 70 | 30 | | | | 5.0 | 1.0 | ○ |
| Ex. 37 | Fomblin M15 | 0.05 | | 70 | | 30 | | | 5.0 | 1.0 | ○ |
| Ex. 38 | Fomblin M15 | 0.05 | | 70 | | | 30 | | 5.0 | 1.0 | ○ |
| Ex. 39 | Fomblin M15 | 0.05 | | 70 | | | | 30 | 5.0 | 1.0 | ○ |

TABLE 2-continued

| Ex. | Fluorinated ether compound (A) Type | Amount used (g) | Solvent composition (mass %) HCFO 1437dycc | 1233zd(Z) | Solvent (B) AC-2000 | AC-6000 | HFE-7100 | HFE-7200 | Amount used (g) | Proportion of fluorinated ether compound (A) (mass %) | Solubility |
|---|---|---|---|---|---|---|---|---|---|---|---|
| Ex. 40 | Fomblin M15 | 0.1 | 70 | | 30 | | | | 5.0 | 2.0 | ○ |
| Ex. 41 | Fomblin M15 | 0.1 | 70 | | | 30 | | | 5.0 | 2.0 | ○ |
| Ex. 42 | Fomblin M15 | 0.1 | 70 | | | | 30 | | 5.0 | 2.0 | ○ |
| Ex. 43 | Fomblin M15 | 0.1 | 70 | | | | | 30 | 5.0 | 2.0 | ○ |
| Ex. 44 | Fomblin M15 | 2.0 | 70 | | 30 | | | | 5.0 | 28.6 | ○ |
| Ex. 45 | Fomblin M15 | 2.0 | 70 | | | | 30 | | 5.0 | 28.6 | ○ |

As is evident from Tables 1 and 2, it is seen that in Ex. 1, 6, 19 and 28, wherein 1437dycc or 1233zd(Z) was used alone as a solvent, the fluorinated ether compound (A) could not be dissolved, whereas in Ex. 2 to 5, 7 to 18, 20 to 27 and 29 to 45, wherein a solvent composition was used, the fluorinated ether compound (A) had excellent solubility.

<Application Test of Lubricant Solution>

The lubricant solution of Ex. 11 was applied to the surface of an aluminum-deposited plate having aluminum deposited on a steel plate, in an average thickness of about 0.4 mm, and air-dried under the condition of 25° C. (room temperature) to form a lubricant coating film on the surface of the aluminum-deposited plate. The lubricant coating film was visually observed, whereby it was found to have been applied uniformly.

INDUSTRIAL APPLICABILITY

The lubricant solution is useful, as it can be used, for example, in magnetic recording media and sliding and contacting parts of electrical equipment.

This application is a continuation of PCT Application No. PCT/JP2020/007795, filed on Feb. 26, 2020, which is based upon and claims the benefit of priority from Japanese Patent Application No. 2019-034417, filed on Feb. 27, 2019. The contents of those applications are incorporated herein by reference in their entireties.

What is claimed is:

1. A lubricant solution, comprising:
   a solvent composition which comprises a hydrochlorofluoroolefin and at least one member selected from the group consisting of 1,1,1,2,2,3,3,4,4,5,5,6,6-tridecafluorohexane, 1,1,1,2,2,3,3,4,4,5,5,6,6-tridecafluorooctane, nonafluorobutyl methyl ether, nonafluorobutyl ethyl ether and 3-methoxy-4-trifluoromethyl-1,1,1,2,2,3,4,5,5,5-decafluoropentane; and
   a fluorinated ether compound not having a branched structure and represented by the following formula (I-b):

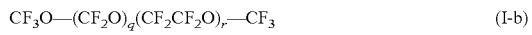

$CF_3O-(CF_2O)_q(CF_2CF_2O)_r-CF_3$ (I-b)

where q+r=40 to 180, and q/r=0.5 to 2,
   wherein the hydrochlorofluoroolefin comprises at least one member selected from the group consisting of 1-chloro-3,3,3-trifluoropropene and 1-chloro-2,3,3,4,4,5,5-heptafluoro-1-pentene,
   the content proportion of the hydrochlorofluoroolefin to the total amount of the solvent composition is from 70 to 99 mass %,
   the content proportion of the total of 1,1,1,2,2,3,3,4,4,5,5,6,6-tridecafluorohexane, 1,1,1,2,2,3,3,4,4,5,5,6,6-tridecafluorooctane, nonafluorobutyl methyl ether, nonafluorobutyl ethyl ether and 3-methoxy-4-trifluoromethyl-1,1,1,2,2,3,4,5,5,5-decafluoropentane, to the total amount of the solvent composition, and is from 1 to 30 mass %, and
   the content proportion of the fluorinated ether compound to the total amount of the lubricant solution is from 0.1 to 30 mass %.

2. The lubricant solution according to claim 1,
   wherein the content proportion of the hydrochlorofluoroolefin to the total amount of the solvent composition is from 70 to 91 mass %,
   the at least one member in the solvent composition is selected from the group consisting of 1,1,1,2,2,3,3,4,4,5,5,6,6-tridecafluorohexane, 1,1,1,2,2,3,3,4,4,5,5,6,6-tridecafluorooctane, nonafluorobutyl methyl ether, and nonafluorobutyl ethyl ether,
   the content proportion of the total of 1,1,1,2,2,3,3,4,4,5,5,6,6-tridecafluorohexane, 1,1,1,2,2,3,3,4,4,5,5,6,6-tridecafluorooctane, nonafluorobutyl methyl ether, and nonafluorobutyl ethyl ether, to the total amount of the solvent composition, is from 9 to 30 mass %, and
   the content proportion of the fluorinated ether compound to the total amount of the lubricant solution is from 1.0 to 29 mass %.

3. The lubricant solution according to claim 1, wherein the hydrochlorofluoroolefin consists of at least one member selected from the group consisting of 1-chloro-3,3,3-trifluoropropene and 1-chloro-2,3,3,4,4,5,5-heptafluoro-1-pentene.

4. A method for producing a substrate provided with a lubricant coating film, the method comprising:
   applying the lubricant solution of claim 1 to a substrate; and then
   evaporating the solvent composition to form a coating film of the fluorinated ether compound on the surface of the substrate.

5. The production method according to claim 4, wherein the solvent composition is evaporated at a temperature of from 20 to 100° C.

6. The lubricant solution according to claim 1, consisting of:
- the solvent composition which consists of the hydrochlorofluoroolefin and the at least one member;
- the fluorinated ether compound; and
- optionally at least one selected from the group consisting of a silicone lubricant and a fluorinated lubricant other than the fluorinated ether compound.

* * * * *